United States Patent
Hill

[11] 3,813,106
[45] May 28, 1974

[54] PISTON RING
[75] Inventor: Donald C. Hill, St. Louis, Mo.
[73] Assignee: Eaton Corporation, Cleveland, Ohio
[22] Filed: June 27, 1972
[21] Appl. No.: 266,829

Related U.S. Application Data
[60] Division of Ser. No. 69,737, Sept. 4, 1970, which is a continuation-in-part of Ser. No. 865,593, Oct. 13, 1969, abandoned.

[52] U.S. Cl.............................. 277/173, 277/205
[51] Int. Cl................................................ F16j 9/20
[58] Field of Search ............ 277/216, 173, 178, 205

[56] References Cited
UNITED STATES PATENTS

| | | | |
|---|---|---|---|
| 1,779,487 | 10/1930 | Mummert | 277/78 |
| 2,415,594 | 2/1947 | Jessup | 277/178 |
| 2,459,395 | 1/1949 | Smith | 277/216 |
| 2,577,022 | 12/1951 | Lieberherr | 92/169 |
| 3,542,376 | 11/1970 | Dykehouse | 277/216 X |
| 3,704,893 | 12/1972 | Hill | 277/173 |

FOREIGN PATENTS OR APPLICATIONS
356,943   9/1931   Great Britain ..................... 177/178

Primary Examiner—Samuel B. Rothberg
Attorney, Agent, or Firm—Teagno & Toddy

[57] ABSTRACT

An internal combustion engine piston having a live head-land ring whose cross-section is imbalanced by differentiating it from a circumscribing circle whose diameter equals the maximum diagonal dimension to exterior corner points (which, in the case of a ring having a blunted cover or tapered face, will be the virtual corner point) of the ring when free and unconfined, so that more material is omitted within the inner-upper and outer-lower quadrants than within the inner-lower and outer-upper quadrants, or vice versa depending upon the sense in which torsional twist is desired when the ring is contracted to cylinder diameter.

4 Claims, 16 Drawing Figures

PATENTED MAY 28 1974

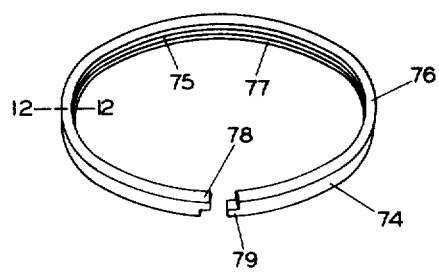
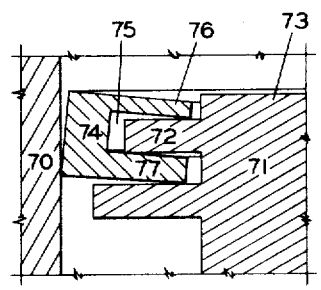
FIG. 11.    FIG. 12.
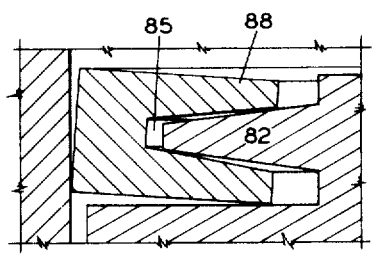
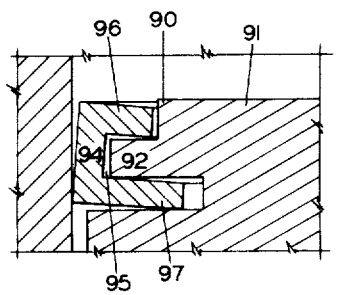
FIG. 13.    FIG. 14.
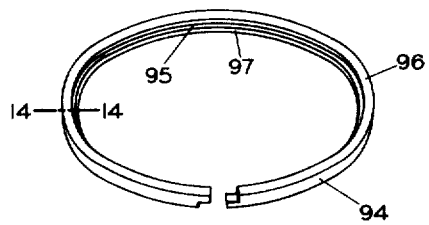
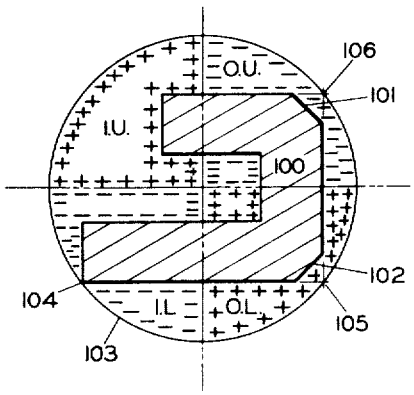
FIG. 15.    FIG. 16.

3,813,106

PISTON RING

CROSS-REFERENCE TO RELATED APPLICATION

This is a division of my prior co-pending application Ser. No. 69,737 filed on Sept. 4, 1970 which is in turn a continuation-in-part of my prior application Ser. No. 865,593 filed Oct. 13, 1969, now abandoned.

This invention relates generally to reducing the omission of atmospheric pollutants from internal combustion engines, and particularly to the relationship between a piston ring and a piston having a head-land groove.

Some internal combustion engines have heretofore had a relationship between piston and piston ring wherein the piston ring (sometimes called the "fire ring") closest to the combustion chamber is accommodated in a ring-groove whose upper land is either absent or of substantial lesser outside diameter than other lands, whereby a substantially greater increment of the upper side of the fire ring is exposed to the cylinder gases than would be exposed in the more common arrangement where the clearance between any land and the adjacent cylinder wall seldom exceeds 0.050 inch at each end of a diameter. In some cases, such land between the fire ring and the combustion chamber is an integral part of the piston, and in other cases it is separable, but, in either event, the arrangement has come to be known in the art as the "head-land ring" construction, and has gone into considerable use in two-stroke cycle gasoline engines where the rings are "dead". The line of demarcation between "dead" and "live" rings is not precisely defined by any industrial standard, and there is latitude in each; but for the purpose of this disclosure, a ring may be considered dead when its internal stress at installed diameter is less than 40 percent of the maximum internal stress that could exist without exceeding the rupture strength of the material either as a finished ring or during the machining process. In explanation, reference may be had to FIG. 4 of U.S. Pat. No. 1,779,487 wherein the three uppermost rings are of square cross section. If made of conventional "Piston Ring Gray Iron" (SAE J929) with casting size as required to machine to a width and thickness of one-eighth inch (+ standard tolerances), the material in said casting for such a ring (hereinafter called the "archetypal ring") will have a rupture strength of approximately 60,000 PSI. The casting (in complete circular form, i.e., without any gap) is machined and a portion removed to provide a gap (known in the art as "free gap"), which is the gap that exists when the ring is free of all external confining forces. Given the archetypal ring of peripheral length appropriate for use in a cylinder having a nominal 2.82 inch diameter, the free gap cannot exceed 0.462 inch without peril of overstressing the ring metal under diametrical tension to close, which in the case of the archetypal ring could not exceed approximately 11.25 pounds. "Diametrical tension to close", as the expression is used herein, means the magnitude of force applied at diametrically opposite points, in approximate quadrature with the gap of a ring, to so partially close the gap therein that the distance between said diametrically opposed points equals the "installed diameter", which is the diameter of the cylinder in which the ring is to be installed. All other variables remaining constant the diametrical tension to close decreases as the length of the free gap decreases, but when the free gap equals the installed gap, the diametrical tension to close loses all significance because the tension of the ring as installed is zero, which is the ultimate of dead.

In one contemporary version of the head-land ring construction, the ring is L-shaped (or "angle bar" section), and in another version the ring is of "half-keystone" section typified in FIG. 6 of Patent No. 2,459,395. If either of these versions is live by virtue of having anywhere near a normal amount of free gap, it will, when the gap is closed, or nearly closed, within the cylinder, assume an excessive "torsional twist".

Torsional twist is considered excessive when it averages substantially more than about 0.001 inch twist per 0.100 inch of radial thickness of a ring, which may be angularly expressed as about 54 minutes. Rings with excessive torsional twist tend toward breakage resulting from flexing as the cylinder gas pressures tend to untwist them. In the parlance of the art, such twist is "positive" when it tends to force the outer-lower corner of a ring toward a greater diameter than the outer-upper corner; and is negative when it tends to force the outer-upper corner of a ring toward the greater diameter. As used herein, the term "upper" connotes that the subject is closer to the combustion chamber than is its counterpart, designated "lower". Likewise, "outer" connotes that the subject is closer to the cylinder wall than is its counterpart, designated "inner".

When such rings are deadened to avoid the undesirable effects of excessive twist, as has been done by some manufacturers in some applications of head-land rings, there is a tendency toward breakage which results from the lack of tension. In order to reduce the breakage in such a dead ring, such manufacturers have been forced to use more expensive, high strength special iron in the manufacture of such rings. However, a ring which is substantially without intrinsic tension, or dead, is free to flutter under the influence of the changing pressures during the continually reversing strokes of an internal combustion engine. It is this fluttering which exceeds the dampening capacity of the gray iron (from which piston rings are normally cast) and causes breakage. If such rings had substantial intrinsic tension, the need for the high strength special iron, or other such extraordinary materials of construction, would be eliminated, or at least reduced.

Accordingly, it is one object of the present invention to provide a head-land piston ring in which internal stresses are coordinated to stabilize the ring during operation, and thus to reduce the need for making them of special high strength metal.

Although improved performance has been claimed for the dead ring concept when used as a head-land ring, this design requires the building up of gas pressure in the combustion chamber of the engine, and behind the ring, to seat the ring against both the lower side of its groove and the cylinder wall, with consequent leakage occurring between the ring and the cylinder wall during the time that the pressure is building up. Such leakage would not have occurred, at least in anything like the degree in which it does occur, if the ring inherently biased itself against the cylinder wall by virtue of its intrinsic tension. In some four-stroke cycle engines, the dead L-shaped head-land ring has required a coil spring in compression behind it to provide extrinsic tension which results in the face of the ring being held in contact with the cylinder wall during the suction stroke. Such expedients are unsatisfactory becuase of their proclivity to carbon up, and thereby lose effectiveness. It is therefore another object of the invention to eliminate the need, with head-land rings, of such auxiliary devices.

A further object is to improve performance of, and reduce the emission of atmospheric pollutants from, internal combustion engines having a head-land ring.

These and other objects and advantages of the invention are achieved, in accordance with the present invention, by making head-land rings of ordinary piston ring material, (i.e., ordinary Piston Ring Gray Iron, in contrast with the special high strength iron alloy) but with controllably imbalanced cross-sectional configurations, mounting means, and gap-bridging, all coordinatable to produce optimum results under a wide diversity of operating conditions. The ring per se may have any of a variety of cross-sectional shapes such as on-side "T"-shape, on-side "J"-shape, or on-side "U"-shape, so long as they are cross-sectionally unbalanced in a manner such as to produce the desired twist when the ring is contracted from its free and unconfined state to the diameter of the cylinder in which it is installed, such contraction being achieved by moving the opposed gap-ends toward each other, thereby reducing the circumferential length of the gap, and the normal perimeter of the ring (including gap). Such contraction substantially increases the "tension" of any ring which is live, and, if the ring has an unbalanced cross-section, induces twist in it.

Such a live ring of unbalanced cross-section may be mounted on the piston so as to have its upper side face in substantial alignment with, or deliberately disaligned from, the head face of the piston, and it may have said upper side face partially covered by a land, or completely exposed to the hot gases in the combustion chamber. However, any land, even partially covering the upper side face of a ring in immediate adjacence to the head face of the piston has been found to run substantially hotter than the piston head face area radially inward thereof, and manifests itself by excessive carbonization on such a land. Accordingly, it is preferred that the headland ring be so mounted on the piston that its upper face of the ring is substantially, if not completely, exposed to the hot gases in the combustion chamber.

If it becomes desirable to reduce the intrinsic tension of such a ring, the magnitude of its free gap may be reduced and its cross-sectional imbalance changed appropriately to achieve the desired twist at the reduced tension. The latter is accomplished by changing the proportionate amount of material omitted from the inner-upper and outer-lower, vis-a-vis that omitted from the inner-lower and outer-upper quadrants of a virtual circular section whose center is at the midpoint of the diagonal between the desired ring's most remote corner points (or virtual corner points, in the case of a ring having blunted corners or a conical or spherical peripheral face) while in its free and unconfined state, so as to adjust twist back to where it was before the magnitude of the free gap was changed or to any chosen degree or sense. Thus, it is possible to make the ring with either positive or negative twist, or with no twist at all; and the same ring with a cylindrical or convex face at its outer periphery can have the sense of its twist reversed by merely turning it over. There is no need to back up such a ring with an auxiliary spring device that sooner or later would carbon up and become ineffective, and the designer has complete latitude in his selection of the specifications to which the part will be machined, at least to the same degree that he has had in designing the more conventional torsional or non-torsional rings heretofore in use.

The ability to vary tension and twist in rings, so as to suit the needs of individual engines, has always been desirable, but it is not possible to make such adjustments in design in a head-land ring which is dead. Furthermore, the rings contemplated by the present invention are usable in grooves more remote than a head-land groove from the head of the piston as a replacement for, or in addition to its use as, a head-land ring.

Several embodiments of head-land rings — which when made of Piston Ring Gray Iron, and otherwise in accordance with the invention will, with normal (e.g., about 7 to 1 percent of the installed diameter) free gap, not only twist when contracted to installed diameter, but will exhibit a diametrical tension to close equivalent to approximately 50 to 90 percent of the rupture strength of the iron — are illustrated in the accompanying drawings, in which:

FIG. 11 is a perspective view comparable to FIG. 10, but showing a head-land ring of one-side "U"-shaped cross-section with a gap defined by a halved lap joint;

FIG. 12 is a sectional view taken along line 12—12 of FIG. 11, showing the ring of FIG. 11 as mounted upon a piston and within a cylinder;

FIG. 13 is a sectional view comparable to FIG. 12, but showing a ring having a modified form of on-side U-shaped cross-section with an appropriate mounting land;

FIG. 14 is a cross-sectional view comparable to FIGS. 12 and 13, but showing a ring of on-side J cross-section mounted upon a piston within a cylinder;

FIG. 15 is a perspective view of the ring shown in FIG. 14; and

FIG. 16 is a diagrammatic view illustrating a graphical method of predetermining the sense and degree of torsional twist induced by closing the gap of a ring of the general type illustrated in FIGS. 14 and 15.

Figure 1:
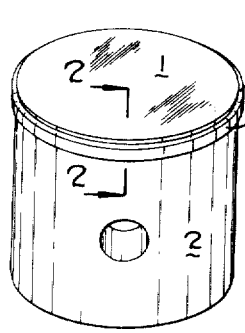
FIG. 1 is a perspective view of a typical piston for a two-stroke cycle engine equipped with a head-land ring constructed in accordance with the present invention.
Figure 2:
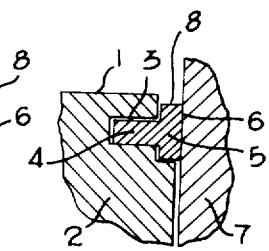
FIG. 2 is a partial sectional view taken along plane 2—2 of FIG. 1, and showing one possible relationship of the ring to a cylinder wall.
Figure 5:
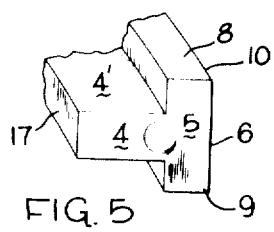
FIG. 5 is a perspective view, showing the gap end, of a head-land ring embodying the invention, and having a cylindrical outside face.
Figures 7, 8:
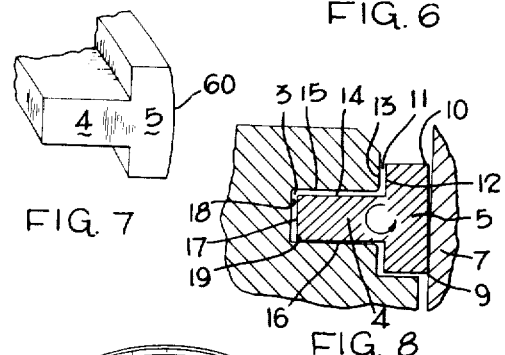
FIG. 7 is a view corresponding to FIG. 5, but showing a head-land ring having a convex or "barrel" shaped outside face in which the face is arcuate in radial section.
FIG. 8 is a diagrammatic view showing (in somewhat exaggerated degree) the relationship of the ring in FIG. 5 with the piston and the cylinder when the ring has positive twist and is contracted to cylinder diameter.
Figure 9:
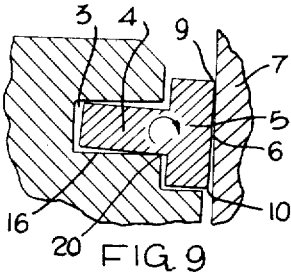
FIG. 9 is a view corresponding to FIG. 8, but showing the ring of FIG. 8 turned upside-down to produce negative or reverse twist.
Figure 10:
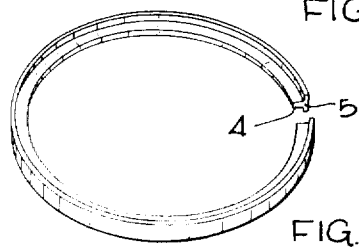
FIG. 10 is a perspective view of a complete ring constructed in accordance with the embodiment shown in FIGS. 1–5, 8 and 9.

In the form shown in FIGS. 1 and 2, the piston has a head 1, a skirt 2, and a single head-land groove 3 to accommodate a T-shaped ring of the form illustrated in FIG. 10, whose tongue 4 interfits, with clearance, within groove 3, and whose bar 5 has its outer face 6 in contact with the cylinder wall 7, while its upper side 8 is exposed to the cylinder gases. From FIG. 5, it will be apparent that the bar 5 of the ring is unbalanced with respect to tongue 4, that is to say, that the horizontal center line of tongue 4 is not coincident with the horizontal center line of bar 5. Such eccentricity, in the embodiment illustrated, amounts to 31 percent of the width (i.e., the vertical dimension as seen in FIG. 5) of the ring, lying above the upper surface 4' of tongue 4. On the other hand, but 27 percent of the width of the ring lies below the lower surface of tongue 4. These proportions of imbalance between the bar and the tongue of the ring produce twist of about 36 minutes, having a sense indicated by the curved arrow on FIG. 5 to produce the ring-groove-cylinder relationship, shown in FIG. 8, when the ring is contracted to cylinder diameter with corner 9 urged, by virtue of the twist, into engagement with the cylinder wall. If the ring shown in FIG. 5 be turned upside down, and contracted from its free and unconfined state to an outside circumference which is approximately that of the cylinder in which it is to operate, the twist will be as shown in FIG. 9 and be termed "negative" or "reverse", but nevertheless continuing to tend to move corner 9 into a position of greater circumference tha crner 10, because corner 9 will now (FIG. 9) be at the upper side rather than at the lower side as shown in FIGS. 5 and 8.

As is well known, increasing the imbalance in the relationship of the bar 5 to the tongue 4 increases the degree of torsional twist, all other things (notably free gap) remaining constant. In operation, where such a live ring with normal gap and normal twist, is used in a cylinder whose internal circumference is less than the free and unconfined outside circumference of the ring, the effect of the cylinder gas pressure upon the ring is illustrated in FIG. 8, where it will be observed that the pressurized cylinder gases have free access to the space 11 between the inner face 12 of the ring and the outer face of head-land 13 on the piston. The local effect of the pressurized gases within space 11 is therefore to urge the ring, or at least the upper increments thereof, in a radially outward direction from land 13, and toward cylinder wall 7. At the same time, however, the pressurized cylinder gases have access to the space 14 between the surface 4' of the ring and the side 15 of the ring groove 3. Such pressure within the space 14 acts on a larger area than at face 12, and hence exerts a greater force axially with the local effect of driving the tongue of the ring downwardly toward the opposite side 16 of the groove 3. Furthermore, the same pressurized gases occupy the space between the back 17 of the ring and the bottom 18 of the groove, and have the local effect of tending to drive the ring radially outward toward engagement with the cylinder wall 7. The inherent twist in the ring, by virtue of it having been contracted from its free gap condition, operates counter to some of these local effects, and tends to move corner 19 of the ring into sealing engagement against groove side 16 at the same time that corner 9 of the ring is urged into sealing engagement with the cylinder wall 7.

The effects with the same ring turned upside down to create a negative twist are illustrated in FIG. 9, where the effect of twist is to urge point 20 on surface 4' (now addressed downwardly) into engagement with groove side wall 16, and to drive corner 9 (now at the upper side) into engagement with cylinder wall 7. However, such turning upside-down does militate against one desideratum, to wit, that (at least during the compression and power strokes) the lowermost side surface of the bar 5 be in substantially sealing contact with the shoulder of the groove adjacent corner 9 as seen in FIG. 8, or adjacent corner 10 as seen in FIG. 9; and that the corner 19 of the tongue 4 have approximately zero clearance with groove side 16 (in the case of FIG. 8) or the groove side 15 (in the case of FIG. 9). While, for clarity of illustration in FIGS. 8 and 9, the relationship of ring and groove is shown with space between the lowermost side surface of the bar 5 and the adjacent shoulder of the groove, those skilled in the art will understand that sealing contact is intended to be made there at least during the compression and power strokes.

The configuration of the outer face 6, shown cylindrical in FIGS. 1–5, 8, 9 and 10, is subject than corner variation in contour for specific known effects without adversely affecting the advantageous performace of the ring. For example, the face 6 may have a conical aspect as shown at 66 in FIG. 6, which is sometimes known in the art as a "taper face". Alternatively, the face 6 may be contoured to the form known in the art as a convex or barrel face 60, as shown in FIG. 7, wherein the cylinder-engaging face of the ring is an arc of a circle whose center lies on the diameter which bisects the face 60. A further alternative is to make the convexity of face 60 eccentric by having the center of its curvature on a diameter of the ring which does not bisect the face 60, thereby either adding to or subtracting from the twist induced by the imbalance of the bar relative to the tongue of the T-shaped section. Likewise, the amount of twist can be coordinated with the degree of tpaer on face 66 of FIG. 6 to produce variations in the tension exerted at 69 and clearance at 68. To assure such clearance with a ring which has positive twist, or no twist at all, the amount of taper in face 66 is normally about 1° off parallel with the axis of the ring when free and unconfined. As previously explained, such clearance would be at the lower side when the ring is turned upside down from the orientation shown in FIG. 6. While such relationship between the face 6 and the cylinder wall 7, as illustrated in FIG. 9, is quite satisfactory for operation in a two-stroke cycle engine, it is less desirable in a four-stroke cycle engine where the direction of taper would, for this application, be reversed and the degree thereof increased to assure that the lower corner 10 contacts cylinder wall 7, and that clearance exists between the top corner 9 (as seen in FIG. 9) and the cylinder wall 7.

Similarly, the relationship between the barrel face 60, of the ring shown in FIG. 7, with the cylinder wall assures initial clearance at both the upper and lower outer corners of the ring regardless of whether the ring is upside up or upside down, and when the ring 60 is utilized in the reverse twist orientation the face convexity may be greater (i.e., the radius may be shorter) than that which obtains when the barrel-faced ring has positive twist.

Figure 3:
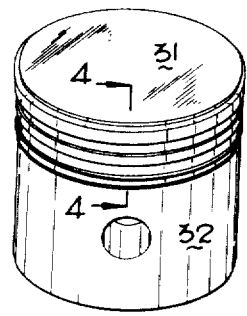
FIG. 3 is a perspective view of a typical piston for use in a four-stroke cycle engine, and having a ring belt including a head-land ring constructed in accordance with the present invention, a conventional intermediate ring, and a conventional oil ring.
Figure 4:
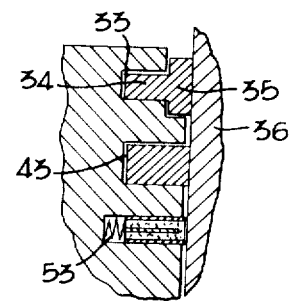
FIG. 4 is a partial sectional view taken along plane 4—4 of FIG. 3, and showing one possible relationship of the rings with a cylinder wall.

Not only does the head-land ring of the invention lend itself to use in two-stroke cycle engines, but it can also be used, with advantage, in four-stroke cycle engines. A four-stroke cycle installation is illustrated in FIGS. 3 and 4, where a typical piston has a head 31, a skirt 32, a head-land ring groove 33, an intermediate ring groove 43, and an oil ring groove 53, but the head-land ring can be of identical configuration with any of the embodiments hereinbefore described so as to provide a T-shaped cross-section with the tongue 34 thereof extending substantially perpendicular with the direction of piston reciprocation, while the bar 35 thereof extends substantially parallel (albeit twisted) with the direction of piston reciprocation. Moreover, the relationship of the T-shaped head-land ring, relative to the cylinder wall 36 and the groove 33, is subject to all of the variations in contour and orientation, with the same effects as those hereinbefore described in connection with the ring for the two-stroke cycle engine.

While in the embodiments shown in FIGS. 1 through 10, the omission of material to create the cross-sectional imbalance which induces twist is confined to the exterior of the ring, other embodiments now to be described involve the converse treatment, to wit: that the omission of material to create the desired imbalance occurs, at least in part, on the interior of the ring. Likewise, whereas in the embodiments previously described, only the upper side face of bar 5 is exposed at all times to the cylinder gases, the embodiments now to be described are so cross-sectionally configurated and mounted that the entire upper surface of each is completely exposed to the cylinder gases, and can be substantially flush with the head face of the piston.

In the embodiment of the invention illustrated in FIGS. 11 and 12, it will be observed that the piston 71 has a foreshortened land 72 near, but in substantially spaced relationship from the head face 73 of piston 71. The head-land ring 74 is provided with a rabbet 75 at its inner periphery. The rabbet 75 is proportioned to accommodate land 72 with freedom for movement relative thereto. Also, the rabbet 75 is eccentric in both the axial and radial dimensions of the ring, thus creating a lesser axial dimension in the upper leg 76 of the ring than in the lower leg 77 thereof. Such imbalance of the cross-section of the ring 74 induces the desired torsional twist when the ring is contracted from its free and unconfined condition, as shown in FIG. 11, to an outside diameter substantially equal to the inside diameter of cylinder wall 70.

The ring shown in FIGS. 11 and 12 is further characterized by the feature that its gap ends 78 and 79 are formed after the fashion of a halved lap joint, so that when the ring is contracted from its free and unconfined condition shown to the diameter of a cylinder in which it is installed, the respective halved laps will be in overlapping relationship. Hence, even with a substantial installed gap, there will be no such direct or unimpeded vent between the ring ends as is the case when the ring ends are chamfered or butt-like, as shown in FIG. 10.

FIG. 13 shows a modification of the arrangement shown in FIG. 12, the only differences being that the eccentric rabbet 85, instead of having the rectangular configuration shown in FIG. 12, has a keystone shape; and that the exterior surfaces of stub land 82 are configurated to mate (with appropriate clearance) with the internal configuration of rabbet 85. This construction reduces the tendency of the ring to stick in the course of normal expansion and contraction and is of special utility in worn cylinders, as proved by a comparative test in a Pontiac engine whose cylinders were worn to a taper of 0.008 to 0.010 inch, and were out of round. The pistons were first equipped with a conventional replacement ring set (i.e., without a head-land ring) and the engine operated under standard test conditions to measure oil consumption and the blow-by. Then the upper land of each piston was reworked to provide a stub land of the form, and at the position, of 82, i.e., so that the upper side face 88 of each ring would be completely exposed to the cylinder gases, as shown in FIG. 13. The other grooves were equipped with duplicates of the rings employed in the first test, and are typified by rings 43 and 53 in FIG. 4. The so equipped pistons were installed in the same engine and operated as in the first test, with the result that oil consumption was substantially unchanged, but blow-by was reduced to 60 percent of that measured in the first test. Thus, the comparative tests demonstrated a substantial reduction in the emission of atmospheric pollutants.

The combination of the keystone-shaped concavity 85 in the ring 88 with the keystone-shaped convexity of the land 82 may, with efficacy, be applied in reverse order to the on-side T-shaped rings shown in FIGS. 2 and 5 through 9 by making the tongue 4 of convex keystone shape and making the groove 3 of companion concave keystone shape. In such application, the desired torsional twist, if any, can be achieved either by adjusting the eccentricity of the keystone tongue relative to the bar 5, or by machining the opposite faces of the keystone tongue at different slopes.

A further modification is shown in FIG. 14, wherein an on-side U-shaped ring is imbalanced by having its upper leg 96 bobbed and made to have the same axial dimension as lower leg 97, thereby to produce a species of U-shape sometimes called a J-shape. Since leg 96 is of lesser radial dimension than leg 97, there is produced an unbalanced cross-section to achieve the desired twist. Between the upper and lower legs 96 and 97, there is a rabbet 95 of uniform axial dimension. As in the previous embodiments, stub land 92 is accommodated in the rabbet 95, but in the case of the ring shown in FIG. 14, the corner 90 of the piston head 91 extends closer to the cylinder wall than in FIGS. 12 and 13, and is so arranged that the upper side face of ring 94 is substantially flush with the head face of piston 91 without being overhung by a land.

As illustrated in FIG. 15, the ring shown in FIG. 14 is equipped, as in the previous embodiments, with a gap defined by a halved lap joint.

Figure 6:
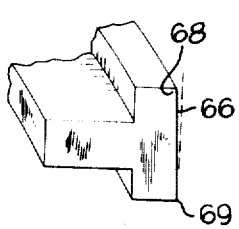
FIG. 6 is a view corresponding to FIG. 5, but showing an embodiment of the head-land ring having a "taper face", i.e., one in which the outer face is generally conical.

In the embodiments of FIGS. 12, 13 and 14, the outer peripheral faces of the rings can be given any of the conventional shapes typified in FIGS. 5, 6 and 7, and can have the sense of their twist reversed by turning them upside down, albeit requiring appropriate modification of the stub land and groove on the piston. However, it will be observed that in FIGS. 12, 13 and 14, there is no land on the piston which overhangs the upper surface of the head-land ring. Consequently, the upper surface of the head-land ring is completely exposed to the hot gases in the combustion chamber. This arrangement has been found to have a decided advantage over the arrangements shown in FIGS. 1 through 6, wherein a stub land does overhang at least part of the upper side face of the ring. Such an overhanging stub land does not freely dissipate its heat, but tends to store it, and hence becomes hotter than any other part of the piston, as evidenced by the observation that with constructions wherein a stub land overhangs part of the upper face of a head-land ring, a band of severe carbonization occurs, and the greater the degree of the carbonization, the more heat dissipation is retarded, with resultant loss of efficiency and increase in pollutant-laden exhaust.

Thus it will be apparent to those skilled in the art that the rings of the invention lend themselves to any of the conventional ring face treatments, such as tin plating, chromium plating, or the application of ceramic and other non-metallic surface treatments. Their corners can be square or blunted as by beveling or rounding, and their outer faces can be cylindrical or tapered or otherwise contoured, and can be grooved and filled with sprayed metal, or other fillers applied by spraying, plating, inlay, or other conventional means. Moreover, the back of the rings (identified as surface 17 in FIG. 8) in all embodiments can be operated upon in any conventional way to vary the degree of torsional twist, or to expose more or less side area or back area to the pressure of the cylinder gases than would be provided by the square rectangular relationship shown in the several figures.

In order to elucidate a graphical method of predetermining the sense and degree in which a head-land ring of the character herein disclosed may be expected to exhibit torsional twist when contracted to installed diameter from its free and unconfined condition, reference may be had to FIG. 16, wherein a J-shaped ring 100, corresponding to that shown in FIG. 14, but having blunted corners 101, 102, is circumscribed by a circle 103, which traverses the actual inner-lower corner point 104, and traverses a virtual corner point 105 adjacent blunted corner 102, and another virtual corner point 106 adjacent blunted corner 101. The virtual corner points 105 and 106 are positioned where the actual corners of the ring would lie had they not been blunted. The circle 103 has a diameter equal to the distance between actual corner point 104 and virtual corner point 106, and the center of circle 103 is at the mid-point of that diagonal.

To ascertain the sense and degree of torsional twist induced in any ring, the circle 103 is divided into quadrants: OU designating the outer-upper quadrant, OL designating the outer-lower quadrant, IU designating the inner-upper quadrant, and IL designating the inner-lower quadrant of the ring, as well as of the circle 103. Those areas within the circle 103 which are not physically occupied by the substance of the ring (shown cross-hatched) are delineated by plus (+) or minus (−) signs, depending upon their orientation. The so-delineated areas in quadrants IU and OL are delineated with plus (+) marks to indicate that the subtraction of material from the circular section to produce the cross-sectional shape of the ring tends to produce torsional twist in the positive sense, i.e., in the counterclockwise direction, as seen in FIG. 16. On the other hand, those areas delineated by minus (−) signs lie in quadrants OU and IL, from which the subtraction of material from the circular section to produce the ring cross-section (shown cross-hatched) tends to produce torsional twist in the negative sense, i.e., clockwise. Accordingly, from the graphical analysis depicted in FIG. 16, one skilled in the art can add the subtracted areas in quadrant IU and quadrant OL to achieve a sum of the forces tending to twist the ring in the positive sense when contracted from its free and unconfined condition; and can add the subtracted areas in quadrants OU and IL to achieve a sum of the forces tending to twist the ring in the counterclockwise direction. Then by subtracting the smaller of those sums from the larger of those sums, a mathematical difference is achieved, the sign of which indicates the direction of the twist, and the magnitude of which is indicative of the degree of twist.

While several embodiments of the invention have been described in detail, it is not to be understood that the invention is limited to the specifics of those embodiments. On the contrary, it is to be understood that the features of the invention are applicable generally to head-land rings and the generation of intrinsic bias and torsional twist therein by merely contracting the ring from its free and unconfined condition to cylinder diameter, and for controlling both the ring tension and the degree and sense of torsional twist in an expeditious and convenient manner.

Having thus described the invention, what is claimed and desired to be secured by Letters Patent is:

1. A one-piece piston ring for use in an internal combustion engine, said piston ring being manufactured of Piston Ring Gray Iron material and being designed to sealingly engage a cylindrical surface of a predetermined diameter, said piston ring being of the head-land type and being split to provide spaced-apart ends defining a gap therebetween, said piston ring having a first diameter when in a free unconfined state, said gap in the free unconfined state of said piston ring being approximately between 7 and 16 percent of said predetermined diameter, said gap being substantially closed when said piston ring is confinedly collapsed to said predetermined diameter, said piston ring having a cross section unbalanced, in the axial direction such that as the gap in the ring is contracted the ring twists to provide a live piston ring of the head-land type having a controlled stress in the material of the cross section of said ring when said ring is at said predetermined diameter, said stress being at least 40 percent of the rupture strength of said material.

2. The piston ring of claim 1 wherein said cross-section is T-shaped with the tongue of said T extending inwardly from the periphery of said ring and wherein approximately 4 percent more of the cross-bar of said T lies on one side of said tongue than lies on the other side of said tongue whereby a controlled amount of torsional twist exists in the cross-section of said ring when said ring is confined to said predetermined diameter.

3. The piston ring of claim 1 wherein the cross-section of said ring is a substantially U-shaped configuration with the legs of said configuration extending radially inwardly from the periphery of said ring and wherein one of the legs of said configuration contains slightly more piston ring material than the other leg to provide a controlled torsional stress in the cross-section of said ring when said ring is confined to said predetermined diameter.

4. A one-piece piston ring of the head-land type, said piston ring being made of a cast iron material and having a substantially U-shaped cross-sectional configuration with legs of said U-shaped configuration extending radially inwardly of the periphery of said ring, one of the legs of said U-shaped configuration being slightly thicker than the other, said ring being split at one portion of the periphery of said ring to provide spaced-apart ends defining a free gap therebetween, the magnitude of said free gap being approximately between 7 and 16 percent of the diameter of said ring, said ring being resiliently deformable to close said free gap and abut said ends, and the material in the cross section of said ring containing a stress of at least 40 percent of the rupture strength of said material when said ends are abutted, said ring being adapted for use in a bore having a diameter such that when said ring is installed therein, said gap is substantially closed.

* * * * *

UNITED STATES PATENT OFFICE
CERTIFICATE OF CORRECTION

Patent No. 3,813,106      Dated May 28, 1974

Inventor(s) Donald C. Hill

It is certified that error appears in the above-identified patent and that said Letters Patent are hereby corrected as shown below:

Column 5, line 46, "tha crner" should read -- than corner --. Column 5, line 38, after "subject" insert -- to conventional --; same line 38, cancel "than corner"; line 54, "tpaer" should read -- taper --.

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,813,106      Dated May 28, 1974

Inventor(s) DONALD C. HILL

It is certified that error appears in the above-identified patent and that said Letters Patent are hereby corrected as shown below:

The term of this patent subsequent to December 5, 1989, has been disclaimed.

Signed and Sealed this

Twenty-seventh Day of July 1976

[SEAL]

Attest:

RUTH C. MASON
*Attesting Officer*

C. MARSHALL DANN
*Commissioner of Patents and Trademarks*